Sept. 1, 1936.          L. B. SNYDER               2,053,115
          PROCESS FOR REPRODUCING COLORED COPY ON PRINTING PLATES
                    Filed Sept. 29, 1934         2 Sheets-Sheet 1
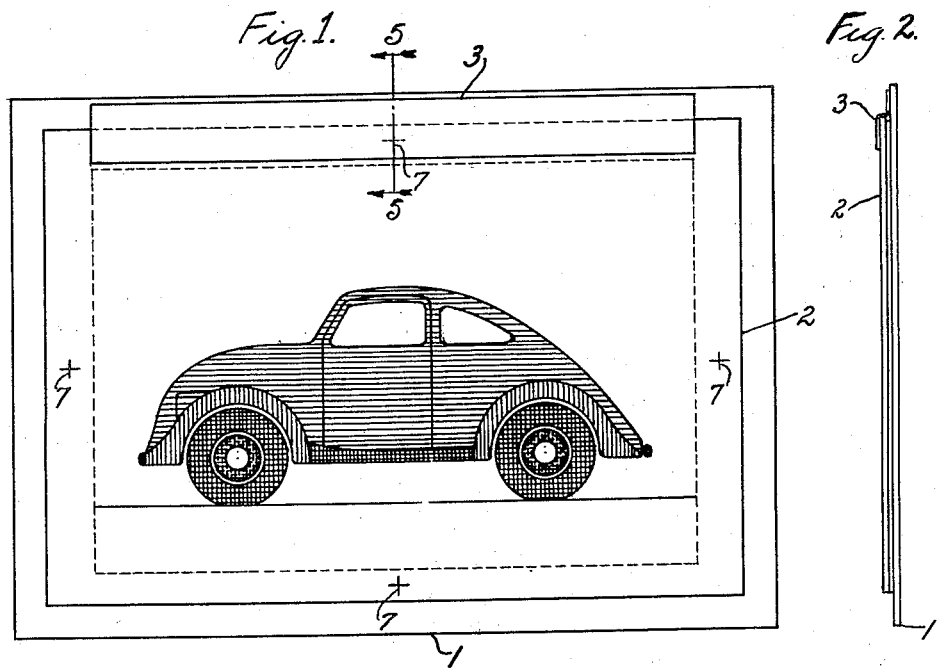
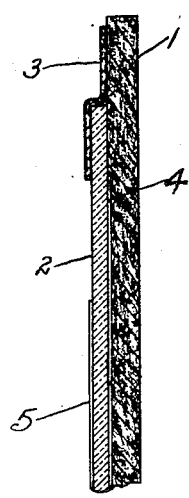
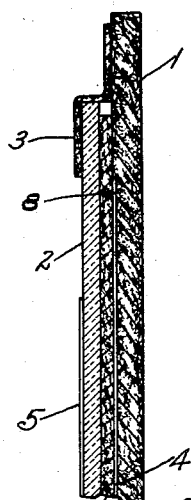
INVENTOR.
Lawrence B. Snyder
BY
George B. Ingersoll
ATTORNEY.

Sept. 1, 1936.  L. B. SNYDER  2,053,115

PROCESS FOR REPRODUCING COLORED COPY ON PRINTING PLATES

Filed Sept. 29, 1934   2 Sheets-Sheet 2

INVENTOR.
Lawrence B. Snyder
BY George B. Ingersoll
ATTORNEY.

Patented Sept. 1, 1936

2,053,115

UNITED STATES PATENT OFFICE 2,053,115

PROCESS FOR REPRODUCING COLORED COPY ON PRINTING PLATES

Lawrence B. Snyder, Detroit, Mich., assignor to Meinograph Process, Incorporated, Detroit, Mich., a corporation of Michigan Application September 29, 1934, Serial No. 746,256

5 Claims. (Cl. 95—5.1)

My invention relates to improvements in a process for reproducing colored copy on printing plates in photo-engraving; and the objects of my invention are, first, to provide a process by which colored copy is reproduced on printing plates; second, to provide a process for reproducing colored copy in which a filter member is located adjacent the copy being photographed; third, to provide apparatus for reproducing colored copy in which an opaque filter member is located adjacent and at the rear of the copy being photographed; fourth, to provide apparatus for reproducing colored copy in which an opaque member is located between a monochrome and a color film; fifth, to provide apparatus for reproducing colored copy in which a colored opaque filter member is located in juxtaposition with the copy being photographed; sixth, to provide a process for reproducing a colored copy on printing plates by photographing the copy with a camera in conjunction with a filter member located remotely from the camera; and seventh, to provide a process for filtering color from behind the copy being photographed by a camera.

I attain these objects by the application illustrated in the accompanying drawings, in which—

Figure 3:
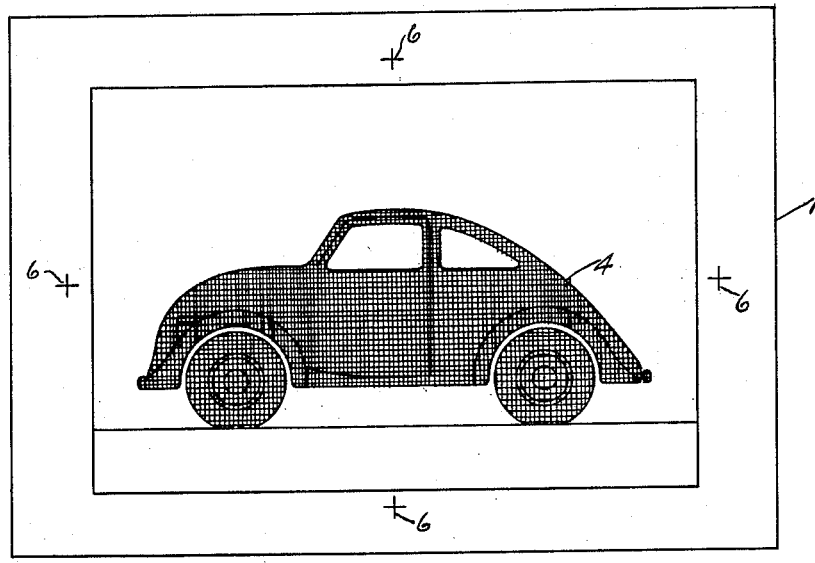
Figure 4:
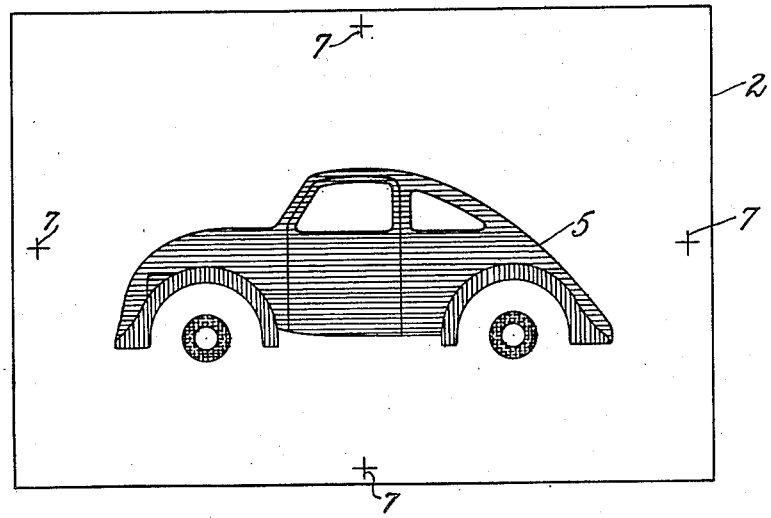

Figure 1 is a side elevation of apparatus used in my process for reproducing colored copy in printing plates; Fig. 2, an end elevation of the apparatus disclosed in Fig. 1; Fig. 3, a side elevation of the black picture or monochrome; Fig. 4, a side elevation of the transparent member or color film; Fig. 5, an enlarged sectional view of the apparatus as normally used, said sectional view being taken on the line 5—5, Fig. 1; and Fig. 6, an enlarged sectional view of the complete apparatus as used in my process for reproducing colored copy on printing plates.

Similar numerals refer to similar parts throughout the several views.

Colored copy, such as oil paintings, water color drawings and tinted photographs have heretofore been reproduced on printing plates by a method which photo-engravers refer to or apply the term "four-color-process" which is based on the principle that in pigments there are three primary colors, namely, yellow, red and blue, and the mixing of any two or three of the primary colors results in or produces various other colors, such as for instance, green, orange and violet. Therefore, each and every drawing, photo, picture, etc., created by pigments contains but three real, original or basic colors.

The above mentioned "four-color process" consists of rendering it possible for each of the above mentioned three primary colors to be photographed in its entirety without interference from either of the other two primary colors so that a separate or individual negative and a separate or individual printing plate can be made for each of the three primary colors. When the three separate or individual printing plates are printed over each other, the three individual printing plates, which are yellow, red and blue plates, thus restore and reproduce on paper all of the colors present in the original drawing, photo, picture, etc., the original or primary colors being restored and reproduced in the correct proportions for attaining all of the secondary colors.

The above mentioned photographing of each of the three primary colors in their entirety without interference from either of the other two primary colors necessitates the separation of the colors in the copy and thus separation of the primary colors is accomplished by a system of filtering out the undesired or unwanted colors, said filtering system being based on the principle of opposing each primary color with its complement, said complement being that color which, when combined with another color results in a total absence of color, as for instance, the complementary colors to the original or primary colors yellow, red and blue are, respectively, violet, green and orange. In the above mentioned system of filtering out the unwanted or undesired colors when photographing for any one of the primary colors, a filter or filter member, composed or incorporating the complementary color of the primary color for which a printing plate is being developed, is placed in the camera which is being used in the photographing operation. For instance, in photographing for the red plate, a green filter or filter member is placed or located in said camera and the total reflected light rays from the drawing, photo or picture which is being photographed to obtain said red plate, with the exception of the reflected rays from the red which will be prevented or "stopped", will pass through said filter or filter member with the result that, in visual effect, all of the yellow and blue colors will vanish from said drawing, photo or picture and only the red color or parts remain, said red color or parts standing out in bold relief for the lens of said camera to pick up and record on the sensitized plate, thus insuring that any portions of said drawing, photo, or picture which may have been violet, orange, purple, or in any other secondary color, disappear; that is, in the above mentioned instance the yellows and blues in their composition disappear and only the reds remain for recording on the sensitized plate of said camera.

In a similar way when photographing for the yellow plate, a violet filter or filter member will be used to neutralize or kill the red and blue colors of said drawing, photo, or picture. Also when photographing for the blue plate, an orange filter or filter member will be used to neutralize or kill the yellow and red colors of said drawing, photo, or picture.

The filter or filter member as ordinarily and commonly used in the filtering process is a circular or conventionally shaped piece of material, such as celluloid or similar material, which is stained with aniline color, said filter or filter member being usually located or placed behind the lens of said camera used in the operation of the color process.

The fourth color in the "four-color-process" is black. It is to be understood that whereas black, in theory, is not a color, it is commonly referred to as the fourth color of, and is so used, in said "four-color-process" only to strengthen the details in the drawing, photo, or picture and to procure such neutral shades of gray color as cannot be obtained by the superimposition of the three primary colors.

The making of the fourth color, or black plate of the "four-color-process", is the most difficult due to the fact that black is basically nothing more than a combination of the three primary colors.

It is to be noted that in straight photography, the colors yellow and red show very dark and the color blue shows very light, with the result that in photographing a colored drawing, photo or picture, the resultant picture is ordinarily one in which the tonal values are in direct contradiction to the original drawing, photo, or picture, and the tonal values of the black plate made from said resultant picture will be in direct contradiction to the tonal values present in each of the three color plates of the four-color process.

In order to prevent, as far as possible, such contradiction between the tonal values of the black plate and the tonal values of the three-color plates, a buff filter or filter member is ordinarily used which, while neutralizing color to a certain extent, results in a compromise in which the black plates always resemble the result of a makeshift which really is the case as the pure blacks of the drawing, photo, or picture cannot be picked up and recorded by the lens of said camera without interference from the colors, and the partial removal of said colors entails a great deal of manual manipulation.

In my invention for a process for reproducing colored copy on printing plates, I utilize the apparatus disclosed in the application for United States Letters Patent for Process for reproducing colors and apparatus used therewith, Serial Number 743,653, filed by Fred J. Meinzinger, on September 12, A. D., 1934. In said application, Serial No. 743,653, a process is utilized for reproducing colors in a new and original method of preparing monochrome copy for color reproduction by process engraving and utilizes the application of inks, dyes or other suitable coloring agents to a transparent or translucent and preferably flexible member which may be specially treated to render it non-porous and non-absorptive to prevent the coloring agents from being absorbed thereby, said member indicated at 2 being hereinafter referred to as the color film and is of colored transparency and having preferably flexible characteristics.

The color film 2 may be suitably connected to the monochrome 1, as by the hinge member 3, so as to permit the color film 2 to be placed in juxtaposition with the monochrome 1, as disclosed in Figs. 1, 2, and 5, so that the color film 2 with its colored transparency cooperates with and acts as a component portion of the monochrome 1, as desired, and at the same time permits the color film to be moved or displaced relative to the monochrome without loss of realism and to enable the color film 2 and the monochrome 1 to be used, as desired, in their separate identities.

The monochrome 1 incorporates the photograph or print which has been taken to record the picture of the original scene or object which is desired to be reproduced in colors and for purpose of illustration, the monochrome 1 is disclosed as incorporating thereon the picture 4 of an automobile which is delineated thereon by black coloring on the light surface of the monochrome 1.

It is to be especially noted that the color film 2 will incorporate a delineation or form 5 of the picture 4, said form 5 being substantially the same in area and so located on the color film 2 that when the color film 2 is pivotally moved or swung on its hinge 3 to its position adjacent or in juxtaposition with the monochrome 1, the picture 4 and the form 5 will be substantially in alignment and the superimposition of the color film over the monochrome results in the visual and practical effect of converting the monochrome into a full colored copy, and at the same time permits the removal of the color film 2, from its position of juxtaposition with the monochrome 1, to leave the monochrome 1 intact and with its original characteristics to permit the making of single color engravings therefrom as desired.

Therefore when combined, the monochrome 1 and the color film 2 cooperate to form a complete unit or assembly and incorporate a colored image for visual observance and understanding as well as perfect "copy" for the making of printing plates by color-process engraving.

Also the monochrome 1 may be provided with the crossed lines 6 or similar medium to permit the similar crossed lines 7 or similar medium on the color film 2 to be aligned therewith to facilitate the location of the color film 2 and its color form 5 in alignment with the picture 4 on the monochrome 1.

It is to be understood that all photographic print paper, or similar material, of which the monochrome 1 and its surface is constructed, due to its fibrous and similar characteristics, is highly porous and will readily absorb transparent colors which results in the following definite and negative results, namely, first the physical mixing and absorption of the applied colors with and by the paper results in the colors becoming permanently and integrally associated with the blacks or black coloring present in the picture 4 of the monochrome and causing the colors to lose their brilliance through and by said association so that their purity is lost and is not possible of reproduction, and second, the colors thus applied to the photographic print paper cannot be removed therefrom, thereby rendering it impossible to apply alternate colors to the paper with the assurance that said colors will retain their purity or to otherwise make any alterations or corrections in the picture 4 successfully.

It is also to be noted that whereas the direct application of the transparent colors over and on black, will not change said black to color but will on the contrary simply intensify the black to which said color is applied, the color being applied as indicated by the form 5 to a transparent or translucent member such as the color film 2 which when used in combination with an opaque object, such as the monochrome 1, will enable the monochrome 1 and the color film 2 to be visually and photographically recognized as an entirety or assembly, the monochrome 1 supplementing certain portions of the color film 2 to utilize the tonal values in the monochrome 1 to form relatively corresponding tonal values in the color film 2.

It is also to be noted that the color form 5 will not be absorbed by the structure or materials from which the color film 2 is made, the colors of the form 5 being applied to the outer surface of the color film 2 and thus being spaced from the picture 4 on the monochrome 1, the color film 2 being constructed and if desired specially treated to render it non-porous and non-absorptive to insure the colors of the form 5 being retained on the surface of the color film 2, as clearly disclosed in Figs. 5 and 6.

It is also to be noted that the color film 2 is preferably made with flexible characteristics to enable it to conform closely to the surface of the monochrome 1 when in juxtaposition relative thereto, but the color film 2 may be made, if desired, with rigid and transparent characteristics as it would be if constructed of glass or similar material.

Also it is to be noted that whereas the colors present on the color film 2 are largely what is popularly described as being "flat", a certain portion of them will be interposed or strengthened by the association of the color film 2 with the monochrome 1 and the resultant showing of the monochrome 1 through the transparent color form 5 of the transparent color film 2 with the result that the coloring assumes a definite shape, acquires definite tonal values, and becomes definitely modelled or patterned and to such a degree as to permit them to fully register on the photographic negatives from which the printing plates are made.

It is to be understood that the form 5 of the color film 2 will incorporate the colors for the three color plates, namely, red, blue and yellow, which are taken in a conventional manner and incorporated integrally on the form 5 of the color film 2 and are used to delineate the form, character and tonal values present in the monochrome 1 or black plate, the value of said monochrome 1 or black picture consisting of sharpening, intensifying and illuminating the effects already secured and present in said three color plates.

It is to be noted that the colors of the form 5 being located at a distance from the picture 4 of the monochrome 1 equal to the thickness of the main portion of the color film 2 upon which the form 5 is made will not only enable the colors of the form 5 to be completely picked up by the engraver's camera and fully recorded on the negatives, the camera registering the black of the monochrome 1 through the colors of the form 4 in such a manner that the black resembles shadows of the colors, but the structure of the color film 2 being relative impenetrable will retain the colors on its surface thus enabling the colors to be easily removed when changes or corrections in the colors of the form 5 are desired and said colors can be applied relatively "flat" as the character and colors of tone are imparted to them by their reflected association with the monochrome 1 over and adjacent which they are superimposed.

Due to the fact that the apparatus of the above mentioned patent application, Serial No. 743,653, comprises the two main units, namely the monochrome 1 and the color film 2, which are not permanently fixed adjacent one another but which can be used separately or in combination with one another, said apparatus thus makes possible the interpolation or placement of the filter or filter member 8 between the monochrome 1 and the color film 2, as disclosed in the sectional view Fig. 6, for use in my process for reproducing colored copy on printing plates.

The filter or filter member 8 as utilized in my process and in conjunction with the apparatus of the above mentioned application, Serial No. 743,653, may be constructed of celluloid, paper, metal or of other and similar opaque material or substance, and is thus interpolated or placed between the monochrome 1 and the color film 2, as above described, during the operation of making color-separation negatives for the making of color plates.

The positioning of the opaque filter or filter member 8 between the monochrome 1 and the color film 2 renders it possible for such an opaque filter or filter member 8 to displace or to supplement the filters or filter members ordinarily and commonly placed or located in or adjacent the lens of a camera as above described.

It is to be especially noted that the location of the filter or filter member 8 at the rear of the color film 2, relative to a camera which is being used in the photographing process and in front of the monochrome 1 results in "back filtration" or in other words, the colors are filtered out of the resultant negative from behind the color being photographed as contrasted with the customary methods used heretofore in which the colors are filtered out of the resultant negative from the front of the color being photographed, said customary methods of filtering requiring the necessity of filtering out the colors after they have been reflected through an expanse of atmosphere, the reflection of said colors through said atmosphere breaking up the rays of light and dimming the reflection of the colors so that the filtering process is not as efficient as where the filter member is located immediately adjacent the color film 2 as in my process.

It is to be especially noted that the filter or filter material 8 being located in immediate juxtaposition to the color film 2 makes possible a more complete and effective filtration of the three primary colors due to the opacity of the filter or filter material 8 preventing the recording of the blacks of the monochrome 1 during the operation of photographing for the three color plates thus further resulting in greater purity of color recording.

It is also to be noted that the negatives thus made in my process, due to the absence of unwanted and undesired blacks, will enable the making of color plates on which substantially no manual effort has to be expended to remove undesirable areas, said manual effort comprising such work as staging, re-etching and burnishing which ordinarily may require approximately twenty hours whereby in my process, such manual effort is reduced to approximately two hours.

Also the position of the filter or filter material 8, combined with its opacity, results in creating a sharper and more clearly defined image of the color being photographed as said filter or filter material 8 provides a background against which the color being photographed is silhouetted in most intense or maximum relief.

It is also to be understood that in my invention, in which the opaque filter or filter material 8 is interpolated or located between the monochrome 1 and the color film 2 during the operation of making color-separation negatives for the making of color plates, the opaque sheet or member 8 may be colored and used to serve as a color filter, said color filter displacing or supplementing the filter ordinarily used in the lens of a camera, as above described, or said opaque sheet or member 8 may be devoid of color and used simply to enable the photographing of colors on the color film without interference from blacks in the monochrome 1. The opacity of the filter or filter material 8, or its semblance of such during the operation of photographing, is rendered so by the presence of the colors in or on said filter or filter material 8 and contrawise, the absence of colors would nullify to a great extent the effectiveness of any colorless material or substance used as the filter or filter material 8. For instance whereas it is possible to place a sheet of white paper between the monochrome 1 and the color film 2 and to use a filter, located in the lens of a camera, as described above, in conjunction with said sheet of white paper, such apparatus is not as effective as where the filter or filter material 8 is used for the reason that the sheet of white paper will not serve to so effectively background and intensify the strength of the image in the copy. The most perfect and complete system of filtering in the making of process plates will be a carefully calculated combination of front and back filtration which is possible with my process and the apparatus used therewith.

I claim:

1. A process for reproducing a colored copy of a subject comprising making a complete picture of the subject in a plurality of primary colors on a sole member having transparent characteristics throughout its total effective area, placing behind said sole member one at a time a plurality of color filters each reflecting only a desired color, and photographing by reflection with light from said picture and each of said color filter combinations to obtain a color separation negative for each of said primary colors, printing said separation negatives to obtain plates each having one of said primary colors, and printing said plates over one another to obtain a colored reproduction of said picture.

2. A process for reproducing a colored copy of a subject comprising making a complete picture of the subject in a plurality of colors on a sole member having transparent characteristics throughout its total effective area, placing behind said sole member an opaque color filter to form a combination with one only of said colors on said sole member, and which reflects only one of said plurality of colors of said sole member, and photographing by reflection with light from said picture and said opaque color filter combination to obtain a color separation negative.

3. A process for reproducing a colored copy of a subject comprising making a complete picture of the subject in the three primary colors only of yellow, red and blue on a sole member having transparent characteristics throughout its total effective area, placing behind said sole member a violet colored filter member, photographing by reflection with light from said picture and said violet colored filter combination to obtain a yellow separation negative, replacing said violet colored filter member with a green colored filter member, photographing by reflection with light from said picture and said green colored filter combination to obtain a red separation negative, replacing said green colored filter member with an orange colored filter member, photographing by reflection with light from said picture and said orange colored filter combination to obtain a blue separation negative, printing said separation negatives to obtain yellow, red and blue plates, and printing the yellow, red, and blue plates over one another to obtain a colored reproduction of said picture.

4. A process for reproducing a colored copy of a subject comprising making a complete picture of the subject in colors on a sole member having transparent characteristics throughout its total effective area, placing behind said sole member a color filter which reflects only a desired color, and photographing by reflection with light from said picture and color filter combination to obtain a color separation negative.

5. A process for reproducing a colored copy of a subject comprising making a complete picture of the subject in a plurality of primary colors on a sole member having transparent characteristics throughout its total effective area, placing behind said sole member one at a time a plurality of color filters each reflecting only a desired color, and photographing by reflection with light from said picture and each of said color filter combinations to obtain a color separation negative for each of said primary colors.

LAWRENCE B. SNYDER.